United States Patent [19]

Dancy et al.

[11] 4,385,920
[45] May 31, 1983

[54] GRANULATION OF POTASH SALTS

[75] Inventors: William B. Dancy; Kenneth L. Nichols, both of Carlsbad, N. Mex.

[73] Assignee: International Minerals & Chemical Corp., Terre Haute, Ind.

[21] Appl. No.: 5,047

[22] Filed: Jan. 22, 1979

Related U.S. Application Data

[63] Continuation of Ser. No. 746,658, Dec. 2, 1976, abandoned.

[51] Int. Cl.³ .................. C05B 19/00; C05B 7/00; C05D 1/02
[52] U.S. Cl. .................................. 71/36; 71/50; 71/51; 71/53; 71/64.03; 423/312; 423/548; 423/551
[58] Field of Search ............... 71/31, 33, 34, 36, 50, 71/61, 47, 53, 63, 64 A, 64 R, 64 D, 64 DA, 64.01, 64.03, 64.07, 64.09; 423/179, 302, 303, 308, 312, 395, 499, 409, 517, 548, 551

[56] References Cited

U.S. PATENT DOCUMENTS

| | | | |
|---|---|---|---|
| 3,197,302 | 7/1965 | MacBride | 71/53 |
| 3,466,161 | 9/1969 | Perlmutter et al. | 71/64 R |
| 3,533,776 | 10/1970 | Coates et al. | 71/53 X |
| 3,620,709 | 11/1971 | Petkovsek | 71/63 |
| 3,679,390 | 7/1972 | Young | 71/53 X |
| 3,926,609 | 12/1975 | Effmert et al. | 71/63 |

FOREIGN PATENT DOCUMENTS 1333252 10/1973 United Kingdom ............. 71/50

OTHER PUBLICATIONS

Kirk-Othmer, "Encyclopedia of Chemical Technology," 2nd Edition, vol. 9, 1966, p. 130.
Potash & Potassium Fertilizers, 1966, pp. 142, 143; Noyes.

*Primary Examiner*—Ferris H. Lander
*Attorney, Agent, or Firm*—Robert H. Dewey

[57] ABSTRACT

A process for the granulation of potash salts to produce granules in high yield by the steps of mixing the potash salt with an inorganic phosphate binder and water, granulating the mixture and drying it.

9 Claims, No Drawings

GRANULATION OF POTASH SALTS

This is a continuation of copending application Ser. No. 746,658, filed Dec. 2, 1976 and now abandoned.

BACKGROUND OF THE INVENTION

This invention relates to the granulation of potash salts. In a particular aspect this invention relates to the granulation of potash salts by incorporation of a binder prior to the granulation step.

Potash salts do not easily form large crystals or particles, yet they are needed for use in mixed fertilizers to prevent segregation. Also particles in the desired size range must be strong enough to resist degradation during handling and mixing steps. However, due to lack of plasticity, potash salts resist granulation by conventional rotary drum or pan granulators. Granules formed in these devices lack degradation resistance when dried and the yield of granules in the desired 6×14 mesh Tyler size range is low, e.g. frequently in the 10% range. Consequently recycle rates are very high resulting in exhorbitant production costs.

Thus there is a need for a process for granulating potash salts in high yield in the desired granulation range which will have good structural stability during storage, handling and use.

SUMMARY OF THE INVENTION

It is an object of this invention to provide a process for the granulation of potash salts.

It is another object of this invention to provide a process for the granulation of potash salts by incorporating therein a binder.

Yet another object is to provide a composition of potash salt and binder in granulated form.

Other objects will be apparent to those skilled in the art from the disclosure herein.

It is the discovery of this invention to provide a process for the granulation of potash salts to produce granules in high yield in the desired size range by the step of mixing the potash salt with an inorganic phosphate salt binder and water, and granulating the mixture and drying it.

DETAILED DISCUSSION

In the process of the present invention the potash salt is mixed with the phosphate binder in a ratio of about 30–300 lb (1.5 to 15%) preferably about 100–300 lb (5 to 15%) of binder per ton of crystals; the amount required is variable, depending on the binder selected and the material to be granulated. Water is added, either before or after mixing the potash salt with the binder, in an amount of 150–400 lb per ton of mixture (7.5 to 20%), the exact amount depending on the moisture content, the type and particle size of the potash and binder being used in the operation. The mixing is carried out in a conventional drum or pan granulator, and additional water can be added as required to maximize the production of the preferred size granules. The preferred water content is from about 10 to about 15%. The mixture is then fed to a conventional dryer.

The potash salts which can be granulated by the process of this invention include but are not limited to potassium chloride, potassium carbonate, potassium sulfate, potassium nitrate, langbeinite, and mixtures thereof.

Suitable binders include monoammonium phosphate, diammonium phosphate, mono- or disodium phosphate, mono- or dipotassium phosphate, or a mixture thereof. Also dibasic magnesium phosphate is a suitable binder. All of these compounds are known in the art and most of them are commercially available. The usual commercial grades are suitable for the practice of this invention.

A preferred binder is monoammonium phosphate which can be suitably formed at the time of use. A particularly preferred binder is a mixture of mono- and diammonium phosphates obtained by reacting ammonia with phosphoric acid in a mole ratio of about 1.1–1.5 to 1. Mono- or diammonium phosphate, or mixture thereof, can be formed in situ by premixing the potash salt with a suitable amount of phosphoric acid, then ammoniating the mixture in an ammoniator-granulator known in the art, e.g. a TVA rotary-drum granulator as described by F. T. Nielsson, U.S. Pat. Nos. 2,729,554 and 2,741,545. A preferred source of phosphoric acid is the grade known as wet-process acid because it contains a minor amount of iron, aluminum and other metallic impurities which improve the strength of the potash granules. When the monoammonium phosphate is formed in situ, water is preferably added to the potash salt prior to introduction of the phosphoric acid. The ammoniation step can be carried out preferably with anhydrous ammonia, but aqua ammonia can also be used if desired. In this case the amount of water added as aqua ammonia should be taken into consideration when adding additional water for the granulation step.

When magnesium phosphate is to be used as the binder it can also be conveniently formed in situ during the granulation step. The magnesium is added to the potash salt as the oxide, hydroxide or carbonate and phosphoric acid—preferably wet process phosphoric acid—is sparged into mixture. The magnesium compound and phosphoric acid are used at a mole ratio, generally, of between 0.5–1.5:1, preferably 1:1.

When langbeinite is to be granulated, it is preferably in a form wherein it contains at least 20% of minus 200 mesh Tyler size granules and a minimum amount of plus 30 mesh granules, preferably less than 5%.

Another embodiment of this invention is that granulation of other potash salts than langbeinite can be enhanced by adding a small amount of pulverized langbeinite or other suitable source of magnesium to the potash. Such suitable sources of magnesium include, in addition to the magnesium phosphate cited above, the oxide, the chloride, the sulfate, the carbonate, the nitrate, etc. Langbeinite is used at a rate of 30–70 lb per ton of potash salt. Other magnesium salts are used at a rate equivalent to 20–40 lb of magnesium sulfate per ton of potash salt.

The granulation step is carried out in the conventional manner at the conventional temperatures, e.g. from 160° to 200° F. Similarly the drying step is carried out in the conventional manner.

In accordance with the foregoing it is an embodiment of this invention to provide a composition adapted for granulation comprising a potash salt and an inorganic phosphate binder. More particularly it is an embodiment of this invention to provide a composition suitable for granulation comprising a potash salt, an inorganic phosphate binder therefor in an amount of about 30–300 lbs per ton of potash salt and water in an amount of about 150–400 lb per ton of potash salt wherein the potash salt is potassium chloride, potassium sulfate, potassium carbonate, or langbeinite or mixtures thereof.

Preferred mixtures include those wherein langbeinite is a minor component. The inorganic phosphate is supplied by mono- or diammonium phosphate, mono- or disodium phosphate, mono- or dipotassium phosphate or mono- or dibasic magnesium phosphate, or mixtures thereof. It is also contemplated that another embodiment of this invention is to provide granulated compositions of the foregoing materials having a composition, dry basis, of from about 85–98.5% potash salt and 15–1.5% binder, respectively. In addition, the granulated composition may contain residual water of varying amounts, although usually the composition will be substantially water-free.

The invention will be better understood by referring to the following examples. These examples are intended merely to illustrate the invention and it is not intended that the invention be limited thereby.

EXAMPLE 1

Langbeinite fines were obtained from a dust collector and were used for granulation. It analyzed 5% plus 35 mesh and 26% minus 200 mesh. The granulator was run at 15 tons/hour, using 300 lbs of a mixture of mono- and diammonium phosphate per ton of langbeinite. The ammonium phosphate was formed in situ by introducing wet process phosphoric acid in the appropriate proportions and ammoniating the mixture at a mole ratio of about 1.5 moles anhydrous ammonia per mole of phosphoric acid.

Granulation was carried out in a TVA rotary-drum ammoniator (F. T. Nielsson U.S. Pat. Nos. 2,729,554 and 2,741,545). Water was added as necessary to provide good granulation characteristics. The granulator drum was operated at a temperature of 178°–182° F. The moisture content of the granulated product as it exited from the granulator was 14%. It was then sent to a drier having an inlet temperature of 980° to 1020° F. The temperature of the exit gases was 200°–225° F. and that of the dried product was 110°–120° F.

Satisfactory granulation was obtained as shown by the screen analysis in Table 1.

TABLE 1

| Screen, mesh size | %, Cumulative | | | | | | | | | |
|---|---|---|---|---|---|---|---|---|---|---|
| | 6 | 8 | 10 | 14 | 20 | 35 | 65 | 100 | 200 | −200 |
| Feed | | | | | | 3.5 | 19.7 | 37.3 | 73.6 | 26.4 |
| Granulation at 300 lb/ton | 0.5 | 6.9 | 71.4 | 99.3 | 0.7 | | | | | |
| Granulation at 100 lb/ton | 0.8 | 17.8 | 59.1 | 90.9 | 9.1 | | | | | |

Degradation tests were performed and it was found that 8.4% degradation occurred. This compares favorably with the degradation rate of granular potassium sulfate and diammonium phosphate. The physical quality of the product was acceptable.

EXAMPLE 2

The experiment of Example 1 was repeated in all essential details except that the mono- and diammonium phosphate content was reduced to 100 lb/ton. Satisfactory granulation was obtained as shown by the screen analysis in Table 1. In degradation tests, there was a 7.4% degradation of the granules. Physical quality was acceptable.

EXAMPLE 3

Potassium chloride, 1 ton, is mixed with monoammonium phosphate, 100 lb, and water, 200 lb (10%), in a pan granulator and granulated at 180° F. as is known in the art. The material exiting the granulator is dried, cooled and delivered to storage. The physical quality is acceptable.

EXAMPLE 4

The experiment of Example 3 is repeated in all essential details except that potassium carbonate is substituted for potassium chloride, diammonium phosphate is substituted for monoammonium phosphate and 20% water is added. The physical quality of the granules is satisfactory.

EXAMPLE 5

The experiment of Example 3 is repeated in all essential details except that potassium sulfate is substituted for potassium chloride, monosodium phosphate, 30 lb/ton, is substituted for monoammonium phosphate and 7.5% water is used. The physical quality of the granules is acceptable.

EXAMPLE 6

The experiment of Example 3 is repeated in all essential details except that potassium nitrate is substituted for potassium chloride and monopotassium phosphate, 100 lb/ton, is substituted for monoammonium phosphate. The physical quality of the granules is acceptable.

EXAMPLE 7

The experiment of Example 1 is repeated in all essential details except that disodium hydrogen phosphate is substituted for ammonium phosphate. The physical quality of the granules is acceptable.

EXAMPLE 8

The experiment of Example 7 is repeated in all essential details except that dipotassium hydrogen phosphate is substituted for disodium hydrogen phosphate. The physical quality of the granules is acceptable.

EXAMPLE 9

The experiment of Example 3 is repeated in all essential details except that langbeinite is substituted for ammonium phosphate. The physical quality of the granules is acceptable.

EXAMPLE 10

The experiment of Example 1 is repeated in all essential details except that potassium chloride is substituted for langbeininte and magnesium oxide is substituted for ammonia in an amount to provide an equi-molar ratio with the phosphoric acid. The physical quality of the resulting granules is acceptable.

We claim:

1. A process for the granulation of potassium sulfate, potassium nitrate, and mixtures thereof, comprising the steps of mixing the potash salt with an effective amount of a mono- or dibasic potassium or sodium phosphate binder or mixtures thereof and water, granulating the mixture and drying it.

2. The process of claim 1 wherein the binder is used in an amount of 30 to 300 lb per ton of potash salt.

3. The process of claim 2 wherein the binder is used in an amount of about 100 to 300 lb per ton of potash salt.

4. The process of claim 1 wherein the binder is monopotassium phosphate.

5. The process of claim 1 wherein the binder is dipotassium phosphate.

6. The process of claim 1 wherein the binder is monosodium phosphate.

7. The process of claim 1 wherein the binder is disodium phosphate.

8. A composition adapted for granulation consisting of potassium sulfate or potassium nitrate and a mono- or dibasic sodium or potassium phosphate binder or mixture thereof.

9. A granulated composition consisting of 85 to 98.5% potassium sulfate or potassium nitrate and 15 to 1.5% of a mono- or dibasic potassium or sodium phosphate or mixture thereof.

* * * * *